Patented Apr. 18, 1939

2,155,281

UNITED STATES PATENT OFFICE 2,155,281

PREPARATION OF CHLORINE MONOXIDE

Irving E. Muskat, Akron, and George H. Cady, Wadsworth, Ohio, assignors to Pittsburgh Plate Glass Company, Allegheny County, Pa., a corporation of Pennsylvania No Drawing. Application April 14, 1937, Serial No. 136,802

11 Claims. (Cl. 23—152)

This invention relates to a method of preparing chlorine monoxide; more particularly to an improvement in the method of preparing chlorine monoxide by the reaction of chlorine upon mercuric oxide.

One object of the invention is to provide a process which admits of rapid and safe transformation of chlorine into chlorine monoxide by means of mercuric oxide without substantial liberation of oxygen.

The reaction of chlorine with mercuric oxide has been known for some time. It is supposed to proceed as follows:

(1) $\quad 2Cl_2 + 2HgO \rightarrow HgO.HgCl_2 + Cl_2O$

The reaction may be conducted in liquid suspension or dry; that is, gaseous chlorine may be passed over dry mercuric oxide, the effluent gas containing chlorine monoxide and unreacted chlorine, or the chlorine may be bubbled through a suspension of mercuric oxide in an inert liquid. A variation of the liquid suspension method consists in dissolving chlorine in an inert solvent and agitating the saturated liquid with mercuric oxide.

The chief difficulty that has prevented the utilization of this method of preparing chlorine monoxide on a commercial scale has been inability properly to control the rate and course of the reaction. When gaseous chlorine is passed over the ordinary yellow mercuric oxide of commerce the issuing gas is principally oxygen and not chlorine monoxide. Apparently the reaction proceeds according to the equation:

(2) $\quad 2HgO + 2Cl_2 \rightarrow 2HgCl_2 + O_2$

This undesirable tendency of the mercuric oxide may be decreased by preliminary roasting at 300–400° C., but by this procedure, the resulting solid reacts slowly and the amount of chlorine monoxide produced from a fixed weight of mercuric oxide is smaller than is useful for industrial purposes. If ordinary yellow mercuric oxide is suspended in an inert solvent and chlorine is bubbled through the suspension, it is found that the rate of reaction is slow, and preliminary calcination of the mercuric oxide serves only to slow it up still further.

It has now been discovered that it is possible by proper preparation of the mercuric oxide and control of reaction conditions, to convert chlorine readily and rapidly into chlorine monoxide substantially without side reactions to generate oxygen. Briefly the method consists of precipitating mercuric oxide by the addition of an alkali metal hydroxide or alkaline earth metal hydroxide to aqueous solutions or suspensions of mercury salts under conditions favorable to the formation of an active mercuric oxide.

For the process it is essential to start with a mercury compound more soluble than mercuric oxide in order that mercuric oxide may be formed. While any soluble salt such as mercuric chloride or mercuric nitrate may be used, the preferred starting material is the basic mercuric chloride obtained from the chlorine monoxide-forming reaction. In this way the entire process may be made cyclic. The mercury compound is dissolved in, or in the case of less soluble compounds, suspended in, water. While being vigorously agitated, an aqueous solution or suspension of the alkali is added very slowly. The alkali may be any hydroxide of an alkali or an alkaline earth metal. While the caustic alkalies such as sodium hydroxide effect the most complete precipitation of the mercury, for reasons of economy it is preferred to use milk of lime. If milk of lime is used, it is preferable that it be relatively pure to avoid undue contamination of the mercuric oxide. It is also desirable that the milk of lime be of the finely divided variety obtained by slaking at high temperatures and with violent agitation.

In order that the mercuric oxide be precipitated as completely as possible it is necessary that a slight excess of alkaline material be used. It has been found that when a pH of 10.0 or higher has been attained, the most complete precipitation of mercuric oxide possible has been effected. Most satisfactory results are obtained by adding approximately a stoichiometric proportion or slightly lesser proportion of lime and allowing this to react and then adding a second quantity of an alkaline material, e. g., an additional quantity of calcium hydroxide or a small amount of sodium hydroxide. The amount of these reagents should be sufficient to bring the final pH to the desired value. Any mercury compounds in solution may be precipitated and recovered either by electrolytic deposition or by treating the reaction liquor with $H_2S$ or other more or less completely soluble sulfide and then removing the precipitate.

During the precipitation the mixture is kept at or below room temperature in order that crystal growth be avoided as much as possible. For the same reason it is desirable that the precipitate be not allowed to age in the mother liquor, but should be filtered as soon as complete precipitation has been effected. Drying can be carried out in any convenient manner, but the temperature of the mercuric oxide must not be allowed to exceed about 300° C. for any great length of time, since above this temperature inactivation proceeds rapidly. However, heating to such temperatures for short periods of time is permissible. Drying at any lower temperature e. g. 100–200° C. is permissible.

A mercuric oxide that has been prepared in this manner is notably more active than ordinary mercuric oxide and may be used to prepare chlorine monoxide with a high conversion without decreasing the yield (by percentage conversion is meant twice the weight of chlorine in the produced chlorine monoxide divided by the amount of free chlorine originally added multiplied by 100, while by percentage yield is meant twice the weight of chlorine in the produced chlorine monoxide divided by the weight of combined chlorine multiplied by 100). Further, being very active, it can be used for the dry reaction with chlorine gas diluted with air or any other inert gas to give good yields and conversions in a short time of contact. Ordinary commercial yellow mercuric oxide is apt to produce oxygen instead of chlorine monoxide when treated with pure chlorine, and when treated with diluted chlorine gas, the conversion is too low for commercial utilization.

The following examples will serve to indicate the operation of this invention:

1. An active mercuric oxide was prepared by adding an excess amount of sodium or calcium hydroxide, lime or other suitable alkali in suspension or solution to a solution of mercuric chloride at 27° C. The caustic solution was added slowly, vigorous agitation maintained and the temperature of the mixture kept from rising by suitable cooling. The pH of the final solution was above 10.5. The precipitate was immediately filtered and dried at 110° C. This material, when added to a solution of chlorine in carbon tetrachloride at 30° C., gave in five minutes a conversion of 83.5% and a yield of 95.8%.

2. A mercuric oxide was precipitated as in Example 1 except that the temperature during precipitation was maintained at about 102° C. This material, when treated with chlorine dissolved in carbon tetrachloride under the same conditions as in Example 1 gave in five minutes a conversion of 36.1% and a yield of 93.2%. The difference in conversion due to the difference in temperature of precipitation is striking.

3. Chlorine gas diluted 50% by volume with air was passed in excess and at room temperature over a mercuric oxide prepared from basic mercuric chloride by the process in Example 1. The issuing gas showed a yield of 93.2%. The chlorine monoxide production amounted to 0.208 gram per gram of mercuric oxide. The mercuric oxychloride was reconverted into mercuric oxide by the process described in Example 1.

The filtrate and washings were treated with hydrogen sulfide to precipitate the soluble mercury salts as mercuric sulfide. Electrolytic precipitation may also be employed for the same purpose.

$CCl_4$ is recovered by decanting from mercuric salts and the $CCl_4$ adsorbed with Hg salts may be recovered by the usual methods of vaporization and condensation.

4. A reaction was carried out as in Example 3 using a commercial mercuric oxide. The yield was 85% and the chlorine monoxide production amounted to 0.152 gram per gram of mercuric oxide. The superior activity of the mercuric oxide prepared by the present process is apparent. The rates of flow of the gases in Examples 3 and 4 were the same.

Although the present invention has been described with reference to the specific details of certain embodiments thereof, it is not intended that such details shall be regarded as limitations upon the scope of the invention except insofar as included in the accompanying claims.

What we claim is:

1. A method of preparing chlorine monoxide, which comprises contacting chlorine gas admixed with an inert diluent, with mercuric oxide to form simultaneously chlorine monoxide and basic mercuric chloride, contacting said basic chloride with an alkaline reagent to precipitate mercuric oxide, drying the precipitate at a low temperature whereby the normal activity of the precipitated oxide is retained and contacting the dried precipitate with a mixture of chlorine and an inert fluid diluent to produce a further quantity of chlorine monoxide and basic mercuric chloride.

2. A process as defined in claim 1 in which the mercuric oxide is obtained by precipitating mercuric oxide by contacting an aqueous solution or suspension of a mercury compound more soluble than mercuric oxide with an alkali, and then drying the mercuric oxide at a temperature less than 300° C.

3. A process of preparing chlorine monoxide which comprises treating an aqueous solution or suspension of a mercury compound more soluble than mercuric oxide with an alkaline reagent at a pH substantially above 9, removing the resultant precipitate and drying it at a temperature below about 300° C., suspending the dried precipitate in an inert fluid diluent and contacting the suspension with chlorine gas to form chlorine monoxide.

4. A process as defined in claim 3 in which the inert medium is carbon tetrachloride.

5. A process of preparing chlorine monoxide which comprises treating an aqueous solution or suspension of a mercury compound more soluble than mercuric oxide with lime at a temperature not substantially above room temperature to precipitate mercuric oxide, removing the precipitate and drying it at a temperature below about 300° C., to provide a highly reactive form of mercuric oxide, and contacting the dried material with elemental chlorine in an inert diluent to form chlorine monoxide and basic mercury chloride, removing the basic mercuric chloride and contacting it with an alkaline substance at a temperature not substantially above room temperature, to reform active mercuric oxide, and reusing the mercuric oxide to form additional chlorine monoxide.

6. A process as defined in claim 5 in which the diluent is a gas in a volume not substantially less than that of the chlorine gas.

7. A process of preparing chlorine monoxide which comprises treating an aqueous solution or suspension of a mercury compound more soluble than mercuric oxide with lime to precipitate mercuric oxide, removing the precipitate and drying it at a temperature below about 300° C., to provide a highly reactive form of mercuric oxide, and contacting the dried material with elemental chlorine in an inert diluent to form chlorine monoxide, said diluent being a liquid.

8. A process as defined in claim 7 in which the diluent is carbon tetrachloride.

9. A process of preparing chlorine monoxide which comprises initially preparing highly active mercuric oxide by reacting an alkaline substance with an aqueous solution or suspension of a mercuric compound more soluble than mercuric oxide at a pH value of about 10.5 and at a temperature approximating normally room temperature to form a fine precipitate of mercuric oxide, then substantially immediately removing the precipitate mercuric oxide, drying said oxide at a temperature and at a rate such that the activity thereof is substantially retained, the temperature of drying being not substantially above 300° C., then contacting the mercuric oxide with chlorine gas in not substantially less than an equal volume of gaseous diluent to form chlorine monoxide and basic mercuric chloride, then treating the basic mercuric chloride with alkaline substance to reform highly active mercuric oxide and recycling the oxide.

10. A process of preparing chlorine monoxide which comprises treating an aqueous solution or suspension of a mercury compound more soluble than mercuric oxide with an alkaline reagent at a pH substantially above 9, drying the resultant precipitate while maintaining the temperature of drying below 300° C. during a major portion of the drying operation and contacting the dried precipitate with a mixture of chlorine and an inert fluid diluent to form chlorine monoxide.

11. A process of preparing chlorine monoxide which comprises treating an aqueous solution or suspension of a mercury compound more soluble than mercuric oxide with an alkaline reagent at a pH substantially above 9, drying the resultant precipitate while maintaining the temperature of drying below 300° C. during a major portion of the drying operation and contacting the dried precipitate with a mixture of chlorine and an inert gaseous diluent to form chlorine monoxide.

IRVING E. MUSKAT.
GEORGE H. CADY.